United States Patent
Lin

(10) Patent No.: US 7,055,064 B2
(45) Date of Patent: May 30, 2006

(54) AUTOMATIC RESET SIGNAL GENERATOR INTEGRATED INTO CHIPSET AND CHIPSET WITH RESET COMPLETION INDICATION FUNCTION

(75) Inventor: Scott Lin, Taipei (TW)

(73) Assignee: Via Technologies, Inc., Shindian (TW)

( * ) Notice: Subject to any disclaimer, the term of this patent is extended or adjusted under 35 U.S.C. 154(b) by 552 days.

(21) Appl. No.: 10/301,303

(22) Filed: Nov. 21, 2002

(65) Prior Publication Data

US 2003/0149912 A1    Aug. 7, 2003

(30) Foreign Application Priority Data

Feb. 5, 2002  (TW) ............................. 91101957 A

(51) Int. Cl.
*G06F 11/00* (2006.01)
(52) U.S. Cl. ........................................ 714/23; 327/198
(58) Field of Classification Search ............. 714/23, 714/51, 34, 55; 327/198; 713/501
See application file for complete search history.

(56) References Cited

U.S. PATENT DOCUMENTS

| | | | | |
|---|---|---|---|---|
| 4,803,682 A | * | 2/1989 | Hara et al. ..................... | 714/23 |
| 5,594,865 A | * | 1/1997 | Saitoh ......................... | 714/55 |
| 6,070,248 A | * | 5/2000 | Yu et al. ..................... | 713/501 |
| 6,085,319 A | * | 7/2000 | Uemura ......................... | 713/1 |
| 6,134,655 A | * | 10/2000 | Davis ............................ | 713/1 |
| 6,788,156 B1 | * | 9/2004 | Tam et al. ..................... | 331/49 |
| 6,883,123 B1 | * | 4/2005 | Hashimoto et al. ........... | 714/55 |
| 2002/0003442 A1 | * | 1/2002 | Kuboshima et al. ........ | 327/198 |

* cited by examiner

*Primary Examiner*—Robert Beausoliel
*Assistant Examiner*—Christopher McCarthy
(74) *Attorney, Agent, or Firm*—Madson & Austin

(57) ABSTRACT

A circuit for automatically resetting a central processing unit (CPU) is provided. The circuit includes a detector and a reset signal generator. The detector is electrically connected to the CPU for receiving a specified signal from the CPU, and the detector sends out a triggering signal when the specified signal is not received for a predetermined period of time. The reset signal generator is electrically connected to the detector for generating a reset signal in response to the triggering signal. A chipset with a reset completion indication function is also provided. The chipset includes a plurality of functional circuits and a calculating and recording device.

23 Claims, 6 Drawing Sheets

RPIOR ART

AUTOMATIC RESET SIGNAL GENERATOR INTEGRATED INTO CHIPSET AND CHIPSET WITH RESET COMPLETION INDICATION FUNCTION

FIELD OF THE INVENTION

The present invention relates to an automatically resetting circuit for a central processing unit, and more particularly to an automatically resetting circuit for a central processing unit, which is integrated into a chipset. The present invention also relates to a chipset with a reset completion indication function.

BACKGROUND OF THE INVENTION

In a personal computer, when hardware or software thereof operates improperly, for example resulting from an unstable power supply, or hang-up caused by a software bug, the central processing unit (CPU) will be unable to proceed any command cycle, and it is required to reboot or reset the computer system. Conventionally, the user has to utilize a hardware apparatus such as a reset button or a combination of keys Ctrl+Alt+Del to reset the CPU.

Referring to FIG. 1, a typical reset configuration for a personal computer system includes a central processing unit (CPU) 10, a chipset 11 and a power supply 12. During a reset procedure of the CPU 10, a POWER_OK signal is transmitted from the power supply 12 to either a south bridge unit 110 or a north bridge unit 111 of the chipset 11, and then the chipset 11 responds by sending a CPU_RESET signal to the CPU 10. The CPU 10 is allowed to be reset in response to the receipt of both the CPU_RESET signal and a CPU_POWER_GOOD signal from the power supply 12, wherein the CPU_RESET signal is triggered by either pressing the reset button or simultaneously pressing Ctrl+Alt+Del keys in the keyboard.

The efficiency of such reset system is limited, especially when employed in ceaselessly operating servers, remote-controlled computer or mean time between failure (MTBF) tests after manufactured. For example, if hang-up situation occurs but the CPU is not reset instantly, the ceaselessly operating functions of the servers and the work of the remote-controlled computer are forced to stop, and the MTBF tests are interrupted until the trouble is manually removed. There is likely to be unnecessary time waste. In addition, such reset system is not capable of identifying whether the reset operations are complete and/or which functional circuit has not been reset.

SUMMARY OF THE INVENTION

It is an object of the present invention to provide a circuit for automatically resetting a central processing unit when the central processing unit unexpectedly suspends operation for a predetermined period of time, so as to maintain continuous operation of servers or remote-controlled computer required to ceaselessly operate, and avoid undesirable interruption of MTBF tests.

It is another object of the present invention to provide a chipset with a reset completion indication function, such that a user can realize whether the reset operations are complete and which functional circuit has not been reset.

In accordance with an aspect of the present invention, there is provided a circuit for automatically resetting a central processing unit (CPU). The circuit comprises a detector and a reset signal generator. The detector is electrically connected to the CPU for receiving a specified signal from the CPU, and the detector sends out a triggering signal when the specified signal is not received for a predetermined period of time. The reset signal generator is electrically connected to the detector for generating a reset signal in response to the triggering signal.

In an embodiment, the specific signal is an address strobe (ADS) signal.

In an embodiment, the detector comprises a counter and a triggering signal generator. The counter is electrically connected to the CPU, and capable of counting incrementally in response to a clock signal and outputting a counting value, wherein the counting value is reset in response to the specified signal. The triggering signal generator is electrically to the counter for generating the triggering signal when the counting value reaches a preset value. For example, the counter can be a ripple counter. The triggering signal generator includes an AND gate, wherein the triggering signal is generated when all inputs of the AND gate are logically high.

Preferably, the clock signal is generated from a clock signal generator. The clock signal generator comprises a first frequency divider, a second frequency divider and a first multiplexer. The first frequency divider and the second frequency divider frequency-divides a system clock signal into a first frequency signal and a second frequency signal, respectively. The first multiplexer is electrically connected to the first frequency divider and the second frequency divider, and is used to select one of the first frequency signal and the second frequency signal to be outputted as the clock signal in response to a first select signal.

In an embodiment, the circuit for automatically resetting a central processing unit further comprises a first register electrically connected to the first multiplexer, and storing level data of the first select signal for controlling the output of the first multiplexer.

Preferably, the reset signal generator includes a sample and hold circuit electrically connected to the detector for modifying a waveform of the triggering signal into the reset signal.

In an embodiment, the circuit for automatically resetting a central processing unit further comprises a second multiplexer electrically connected to the reset signal generator and a chipset, and selecting one of the reset signal and an original reset signal from the chipset to be outputted to reset the CPU in response to a second select signal. In addition, the circuit for automatically resetting a central processing unit further comprises a second register electrically connected to the second multiplexer, and storing level data of the second select signal for controlling the output of the second multiplexer.

In an embodiment, the circuit for automatically resetting a central processing unit further comprises an accumulator electrically connected to the reset signal generator for generating an accumulating value in response to the accumulative generation of the reset signal, and a readout register electrically connected to the accumulator for storing the accumulating value available to be read out.

In an embodiment, the circuit for automatically resetting a central processing unit further comprises a power state circuit electrically connected to the reset signal generator for proving a power state signal to the reset signal generator, and the reset signal is outputted when the power state signal is at a normal state.

Preferably, the circuit for automatically resetting a central processing unit is integrated into a chipset.

In accordance with another aspect of the present invention, there is provided a circuit for automatically resetting a central processing unit (CPU). The circuit comprises a detector and a reset signal generator. The detector is electrically connected to the CPU, and sends out a triggering signal when detecting a specified operation of the CPU has suspended for a predetermined period of time. The reset signal generator is electrically connected to the detector, and generates a reset signal in response to the triggering signal to reset the CPU.

In accordance with another aspect of the present invention, there is provided a chipset with a reset completion indication function. The chipset comprises a plurality of functional circuits and a calculating and recording device. The plurality of functional circuits are respectively capable of performing reset operations in response to reset signals, and outputting reset completion signals after completing the reset operations. The calculating and recording device is employed to perform calculating and recording operations on the reset completion signals for being referred by an external device to indicate reset completion of the functional devices connected to the chipset.

In an embodiment, the calculating and recording device comprises an AND gate and a first register. The AND gate receives the reset completion signals and performs an AND operation on the reset completion signals, and outputs a reset completion indication signal for indicating the reset completion of the functional devices connected to the chipset. The first register is electrically connected downstream of the AND gate for storing the reset completion indication signal to be read by the external device.

For example, the external device is an embedded controller. The calculating and recording device comprises a second register of n bit electrically connected to the plurality of functional circuits and the embedded controller for storing the reset completion signals, and providing data stored therein for the embedded controller via a bus interface. The bus interface can be one of a LPC (Low Pin Count) bus and an ISA (Industry Standard Architecture) bus. For example, the embedded controller is embedded in a notebook.

In an embodiment, the external device is a central processing unit (CPU). Furthermore, the calculating and recording device comprises a second register of n bit electrically connected to the plurality of functional circuits and the CPU for storing the reset completion signals, and providing data stored therein for the CPU. Preferably, the data stored in the first register and the second register is read out to be stored in a functional register, and then provided for the CPU via a bus interface. In this case, the bus interface is one of a PCI (Peripheral Component Interconnect) bus and an LPC (Low Pin Count) bus.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
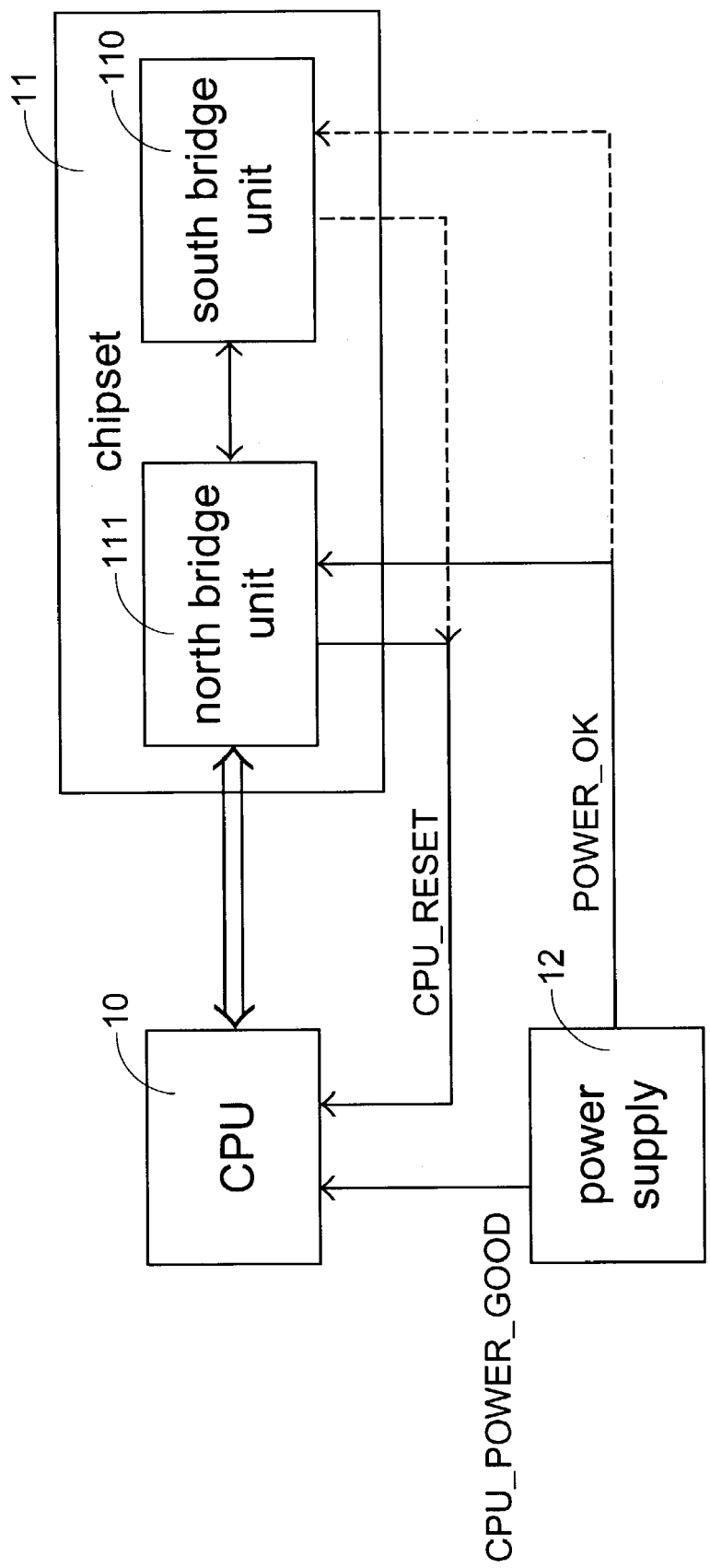
FIG. 1 is a functional block diagram illustrating a typical reset system for a personal computer according to prior art.
Figure 2:
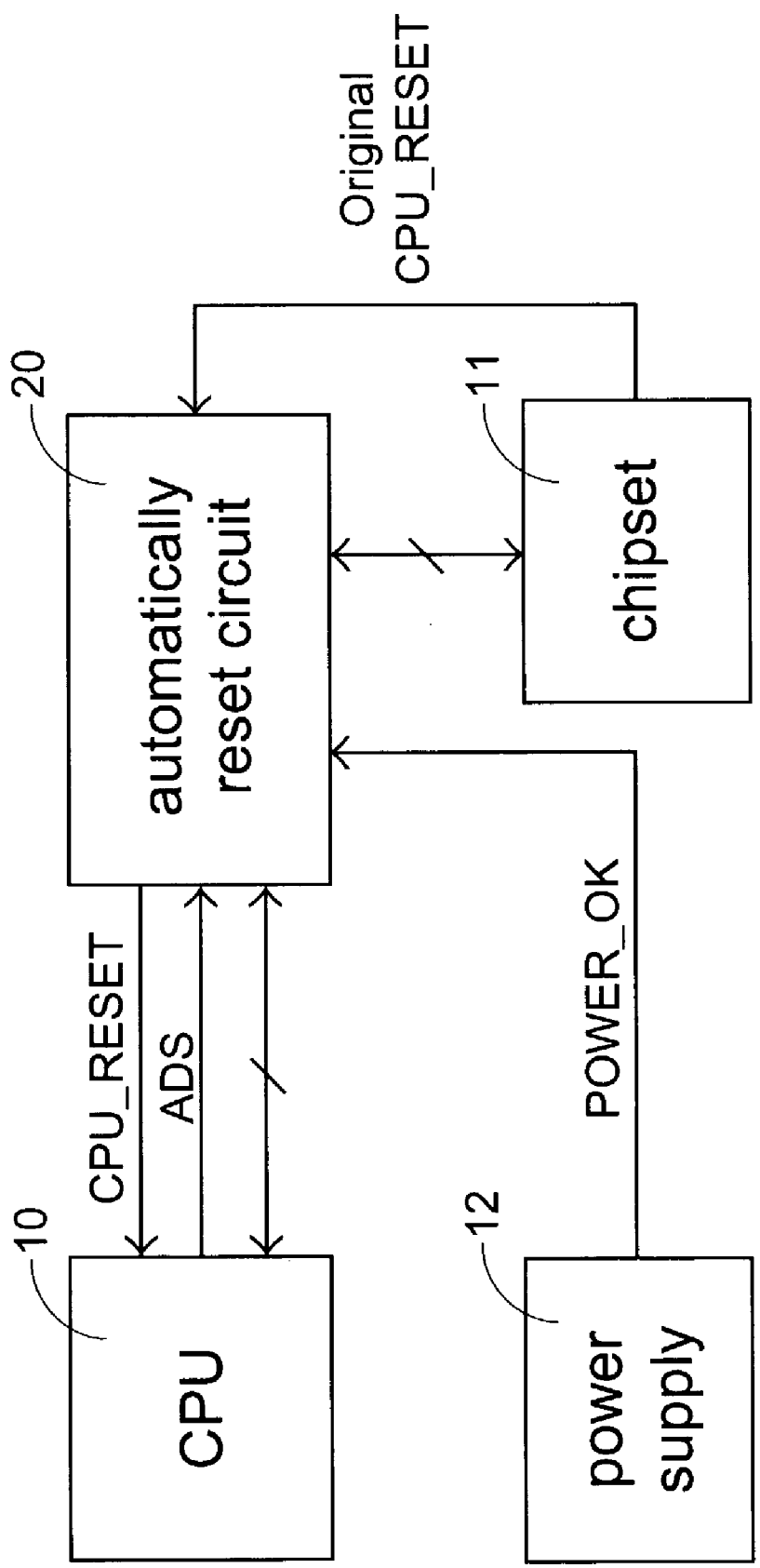
FIG. 2 is a functional block diagram illustrating an automatically resetting system according to the present invention.

Referring to FIG. 2. The automatically reset system according to the present invention includes a central processing unit (CPU) 10, a chipset 11, a power supply 12 and further an automatically reset circuit 20. The automatically reset circuit 20 is electrically coupled to the CPU 10, the chipset 11 and the power supply 12, and will receive an address strobe signal ADS from the CPU 10 and an original reset signal Original CPU_RESET from the chipset 11 to determine if a hang-up occurs. The automatically reset circuit 20 continuously monitors the address strobe signal ADS from the CPU 10. Once the CPU 10 suspends the output of the address strobe signal ADS and thus the automatically reset circuit 20 has not received the address strobe signal for a predertermined period of time, a hang-up situation is determined happened. Therefore, a reset signal CPU_RESET is outputted by the automatically reset circuit 20 to the CPU 10 in order to activate the CPU reset procedure.

Figure 3:
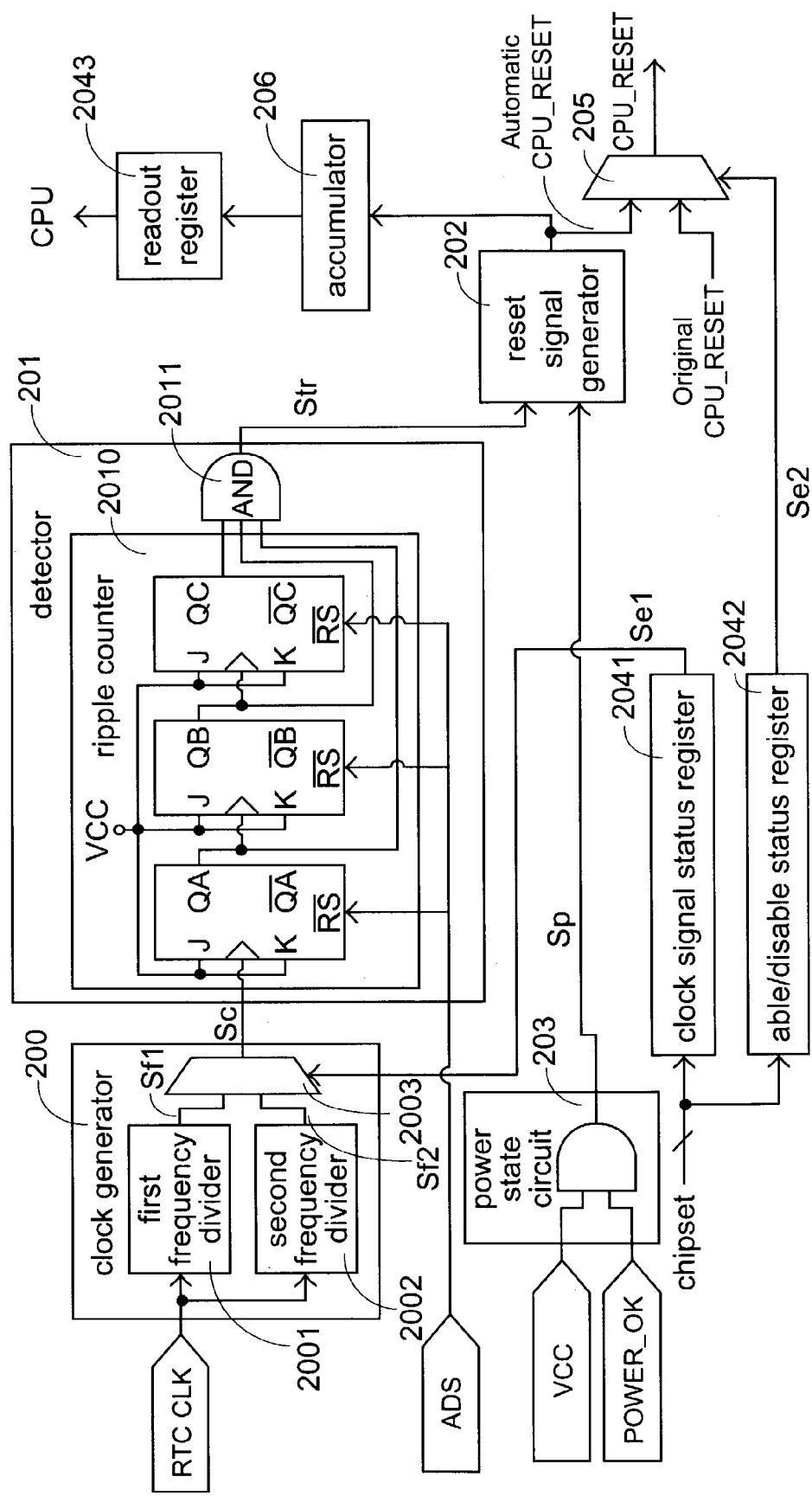
FIG. 3 is a functional block diagram illustrating a circuit for automatically resetting a CPU according to a preferred embodiment of the present embodiment.

FIG. 3 illustrates the automatically reset circuit 20 according to a preferred embodiment of the present embodiment. The automatically reset circuit 20 comprises a detector 201 and a reset signal generator 202. The detector 201 is electrically connected to the CPU for receiving an address strobe signal ADS. When the address strobe signal ADS has not been received for a predetermined period of time, the detector 201 sends out a triggering signal Str to the reset signal generator 202. The reset signal generator 202 also generates a reset signal CPU_RESET in response to the triggering signal Str, and the reset signal CPU_RESET will be transmitted to the CPU 10 as shown in FIG. 2 to reset the CPU 10. The detector 201 comprises a ripple counter 2010 and an AND gate 2011. The ripple counter 2010 periodically counts upwards in response to a clock signal Sc for outputting a counting value. The clock signal Sc is generated from a clock signal generator 200. In addition, the counting value is zeroed in response to the address strobe signal ADS. The AND gate 2011 is electrically to the ripple counter 2010 for generating the triggering signal Str when the counting value reaches a preset value. Meanwhile, all the bits of the ripple counter 2010 are switched from logic "0" to logic "1" eventually. The logic value for the AND gate is "1" when all input ends thereof are at high-level logic values "1", such that the triggering signal Str is outputted. Depending on the frequency of the clock signal Sc or the preset counting value, the length of the predetermined period of time can be adjusted.

The clock signal generator 200 comprises a first frequency divider 2001, a second frequency divider 2002 and a multiplexer 2003. The first frequency divider 2001 and the second frequency divider 2002 are employed for frequency-dividing a system clock signal RTC CLK into a first frequency signal Sf1 and a second frequency signal Sf2, respectively. For example, the first frequency divider 2001 and the second frequency divider 2002 are respectively a divide-by-two circuit and a divide-by-four circuit. The multiplexer 2003 is electrically connected to the first frequency divider 2001 and the second frequency divider 2002 for selecting one of the first frequency signal Sf1 and the second frequency signal Sf2 to be outputted as the clock signal Sc in response to a first select signal Se1. The first select signal Se1 is outputted by a clock signal status register 2041. The clock signal status register 2041 is electrically connected to the first multiplexer 2003 and stores level data of the first select signal Se1. For example, the first frequency signal Sf1 is selected as the clock signal Sc when a logic value of the first select signal Se1 from the clock signal status register 2041 is "0", otherwise the second frequency signal Sf2 is selected as the clock signal Sc when a logic value of the first select signal Se1 is "1".

The reset signal generator 202 is implemented by a sample and hold circuit for modifying a waveform of the triggering signal Str into an automatic reset signal CPU_RESET. In order to be compatible with a normal supplied power, a power state circuit 203 is electrically connected to the reset signal generator 202 for proving a power state signal Sp for the reference of the reset signal generator 202, and the automatic reset signal CPU_RESET will be outputted provided that the power state signal Sp is at a normal state, i.e. POWER_OK.

On the other hand, for the compatibility of the present arrangement with conventional arrangement, another multiplexer 205 is optionally provided to select either the automatic reset signal (Automatic CPU_RESET) or the original reset signal (Original CPU_RESET) from the chipset 11 to reset the CPU. A second select signal Se2 is inputted from an able/disable status register 2042 for controlling the selection of the multiplexer 205. The able/disable status register 2042 is electrically connected to the multiplexer 205 and stores level data of the second select signal Se2 so as to control the output of said multiplexer. For example, the automatic reset signal CPU_RESET from the present automatically reset circuit 20 is selected as the reset signal when a logic value of the second select signal Se2 from the able/disable status register 205 is "1", otherwise Original CPU_RESET is selected as the reset signal when a logic value of the second select signal Se2 is "0".

Moreover, the automatically reset circuit 20 further comprises an accumulator 206 for generating an accumulating value in response to the accumulative generation times of the reset signal. In addition, the automatically reset circuit 20 further comprises a readout register 2043 for storing the accumulating value available to be read out for example by the CPU 10. Therefore, a user can take into account how to improve software and/or hardware stability of the computer system if the reset frequency is extraordinarily high.

Figure 4:
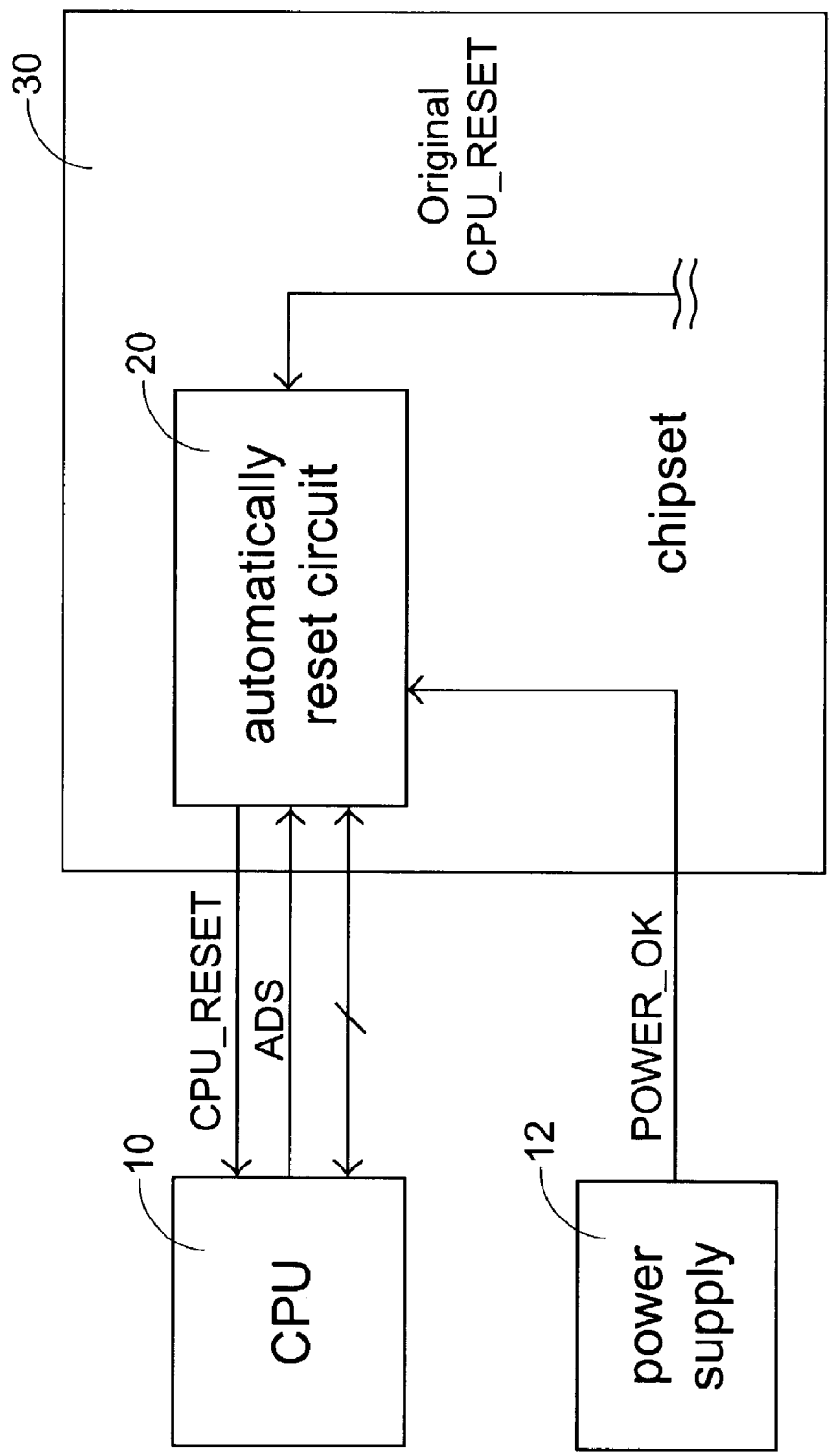
FIG. 4 is a schematic diagram illustrating the resetting circuit of the invention integrated with a chipset.

It is of course that the automatic reset circuit can be integrated within a chipset, as shown in FIG. 4. In this alternative embodiment, the automatic reset circuit 20 is integrated with a multifunctional chipset 30.

It is understood that the automatic reset circuit of the present invention is capable of detecting a hang-up situation and automatically generating a reset signal to reset the CPU. Thus, a server or remote-controlled computer required to ceaselessly operate can maintain their continuous operations, and any undesired interruption of MTBF tests can be effectively avoided.

Figure 5:
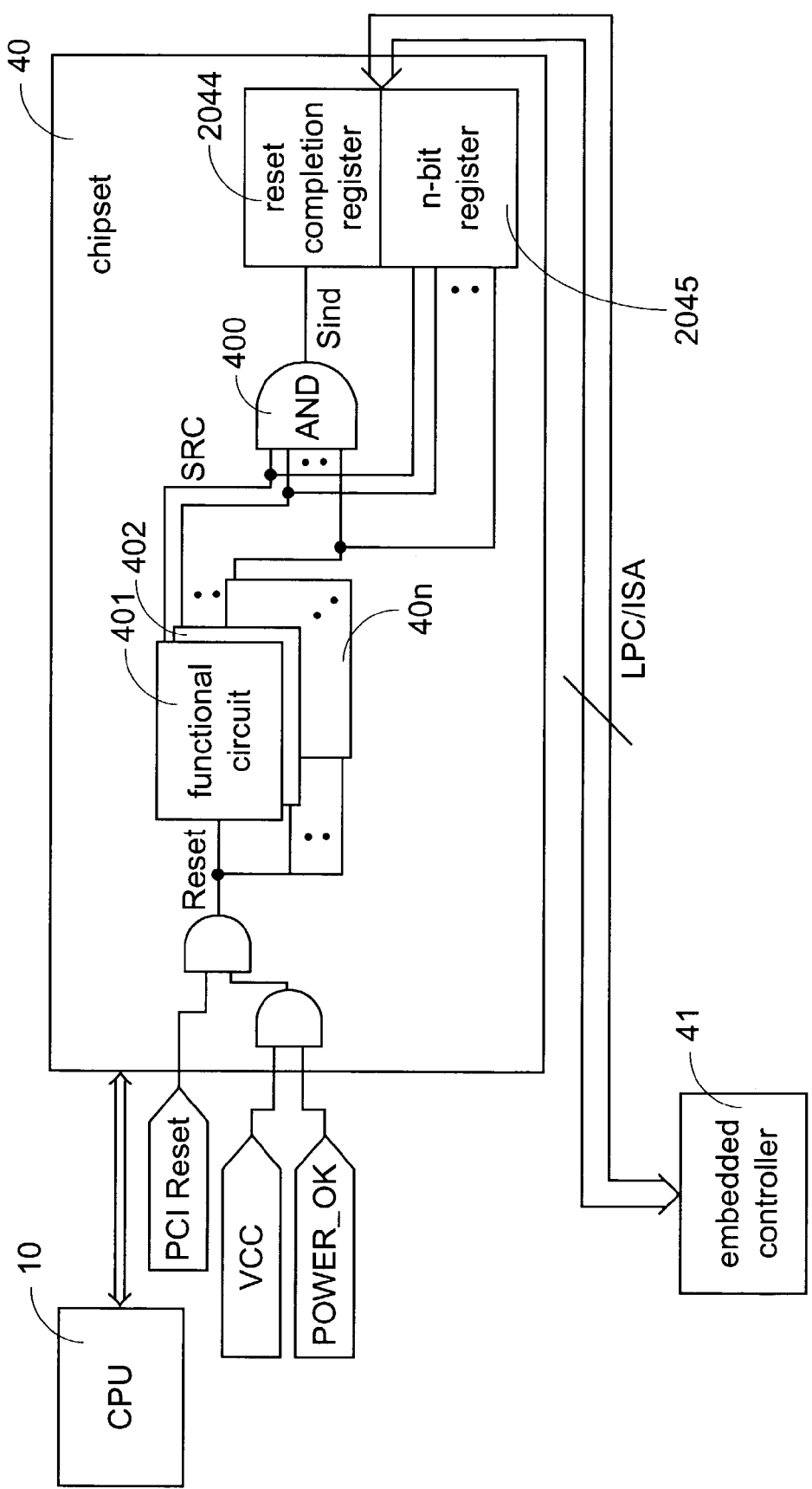
FIG. 5 is a functional block diagram illustrating a chipset with a reset completion indication function according to a preferred embodiment of the present invention, wherein the chipset is applied to a portable computer with an embedded controller.

In order to realize whether the reset operations are complete and which functional circuit has not been reset, the present invention also provides a chipset with a reset completion indication function. FIG. 5 is a functional block diagram illustrating the relations between a chipset 40, an embedded controller 41 and a CPU 10 of a portable computer such as a notebook computer or a pocket computer. The chipset 40 comprises a plurality of functional circuits 410, 402, . . . , 40n, and an AND gate 400. These functional circuits are used for performing reset operations in response to reset signals Reset, and after completing reset operations, reset completion signals SRCs are outputted. The reset completion signals SRCs are inputted into the AND gate 400 to be processed so as to output an indication signal Sind for reference of the embedded controller. The chipset 40 further comprises a reset completion register 2044 electrically connected to the output side of the AND gate 400, and an n-bit register 2045 electrically connected to the plurality of functional circuits 410, 402, . . . , 40n and the embedded controller 41 to store the indication signal Sind and the reset completion signals SRCs, respectively. The data stored in the reset completion register 2044 and/or the n-bit register 2045 are read out by the embedded controller 41 via an LPC (Low Pin Count) bus or an ISA (Industry Standard Architecture) bus. Therefore, whether the reset operations are complete and which functional circuit has -not been reset can be realized to facilitate the improvement of software and/or hardware of the computer system.

Figure 6:
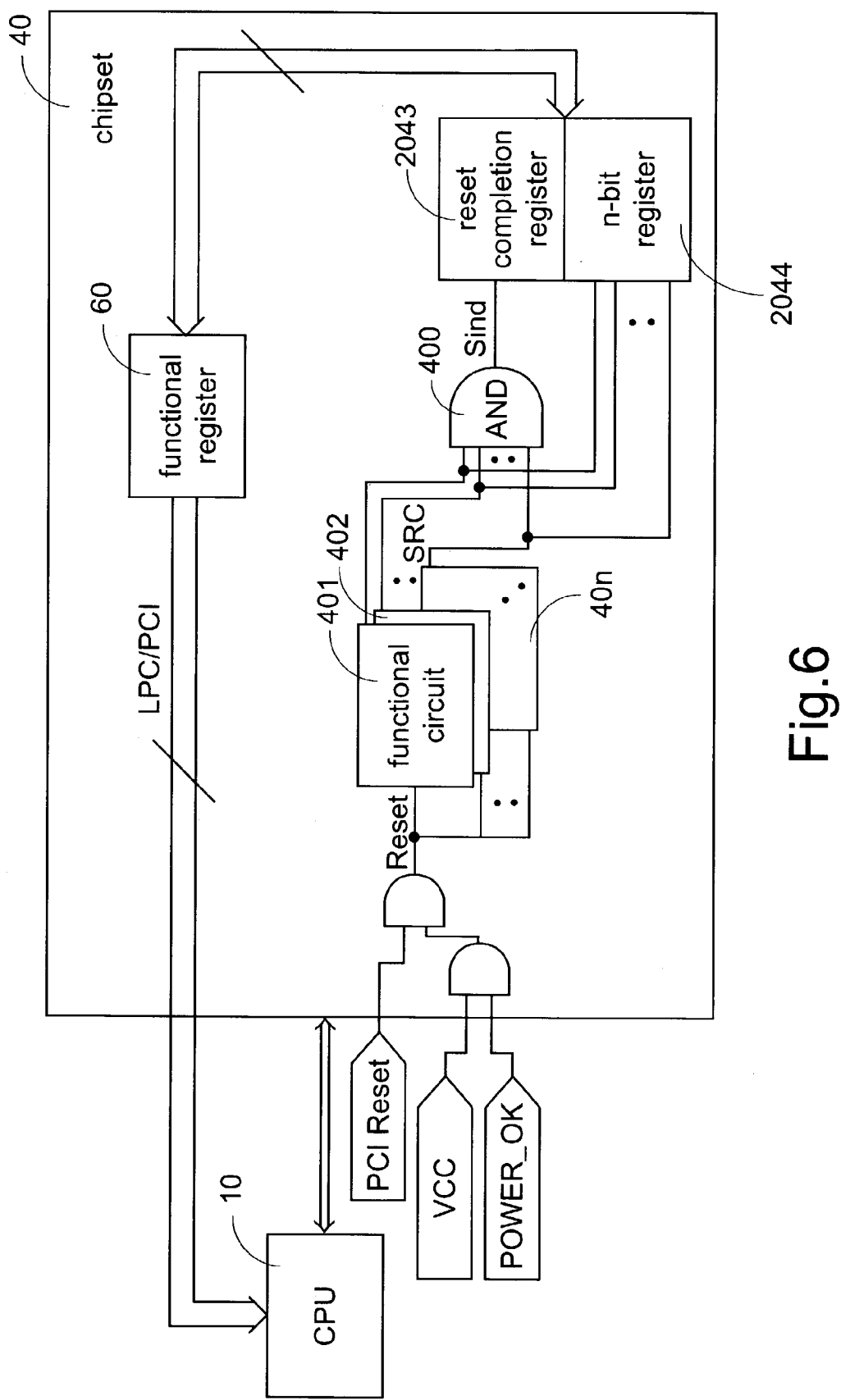
FIG. 6 is a functional block diagram illustrating a chipset with a reset completion indication function according to another preferred embodiment of the present invention, wherein the chipset is applied to a desktop personal computer without any embedded controller.

FIG. 6 also illustrates another alternative chipset implementation with a reset completion indication function according to another preferred embodiment of the present invention, wherein the chipset 40 is incorporated to a personal computer without an embedded controller. The chipset 40 further comprises a functional register 60, which is electrically connected to the CPU 10, for storing data transmitted via an LPC (Low Pin Count) interface or a PCI (Peripheral Component Interconnect) bus from the reset completion register 2044 and/or the n-bit register 2045, and such data are then provided for the CPU 10 via an LPC (Low Pin Count) interface or a PCI (Peripheral Component Interconnect) bus.

The present invention is illustrated by referring to a computer system. Nevertheless, the present invention can be applied to a general digital information processing system. Further, a CPU is exemplified to be reset according to the present invention, and the present invention can also be used with a microprocessor or other equivalent device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A circuit for automatically resetting a central processing unit (CPU), said circuit comprising:
    a detector electrically connected to said CPU for receiving a specified signal from said CPU, said detector sending out a triggering signal when said specified signal is not received for a predetermined period of time; and
    a reset signal generator comprising a sample and hold circuit electrically connected to said detector for generating a reset signal to reset said CPU by modifying a waveform of said triggering signal into said reset signal.

2. The circuit according to claim 1 wherein said specific signal is an address strobe (ADS) signal.

3. The circuit according to claim 1 wherein said detector comprises:
a counter electrically connected to said CPU, periodically counting upwards in response to a clock signal and outputting a counting value, wherein said counting value is reset in response to said specified signal; and
a triggering signal generator electrically to said counter for generating said triggering signal when said counting value reaches a preset value.

4. The circuit according to claim 3 wherein said counter is a ripple counter.

5. The circuit according to claim 3 wherein said triggering signal generator comprises an AND gate, said triggering signal is generated when all inputs of said AND gate are logically high.

6. The circuit according to claim 3 wherein said clock signal is generated from a clock signal generator, and said clock generator comprises:
a first frequency divider, frequency-dividing a system clock signal into a first frequency signal;
a second frequency divider, frequency-dividing said system clock signal into a second frequency signal; and
a first multiplexer electrically connected to said first frequency divider and said second frequency divider, and selecting one of said first frequency signal and said second frequency signal to be outputted as said clock signal in response to a first select signal.

7. The circuit according to claim 6, further comprising a first register electrically connected to said first multiplexer, and storing level data of said first select signal for selecting the output of said first multiplexer.

8. The circuit according to claim 1, further comprising a second multiplexer electrically connected to said reset signal generator and a chipset, and selecting one of said reset signal and an original reset signal from said chipset to be outputted to reset said CPU in response to a second select signal.

9. The circuit according to claim 8, further comprising a second register electrically connected to said second multiplexer, and storing level data of said second select signal for selecting the output of said second multiplexer.

10. The circuit according to claim 1, further comprising:
an accumulator electrically connected to said reset signal generator for generating an accumulating value in response to the accumulative generation of said reset signal; and
a readout register electrically connected to said accumulator for storing said accumulating value available to be read out.

11. The circuit according to claim 1, further comprising a power state circuit electrically connected to said reset signal generator for providing a power state signal to said reset signal generator, and said reset signal is outputted when said power state signal is at a normal state.

12. A circuit for automatically resetting a central processing unit (CPU), said circuit; comprising:
a detector electrically connected to said CPU, sending out a triggering signal when detecting a specified operation of said CPU has suspended for a predetermined period of time;
a reset signal generator electrically connected to said detector, and generating a reset signal in response to said triggering signal; and
a multiplexer electrically connected to said reset signal generator and a chipset, and selecting one of said reset signal and an original reset signal from said chipset to be outputted to reset said CPU in response to a select signal.

13. A chipset with a reset completion indication function, comprising:
a plurality of functional circuits, respectively performing reset operations in response to reset signals, and outputting reset completion signals after completing said reset operations; and
a calculating and recording device, calculating and recording said reset completion signals to indicate whether reset operations of said chipset are complete and which functional circuit has not been reset.

14. The chipset according to claim 13 wherein said reset completion signals are transmitted to an external device.

15. The chipset according to claim 14 wherein said calculating and recording device comprises:
an AND gate receiving said reset completion signals and performing an AND operation on said reset completion signals, and outputting a reset completion indication signal for indicating said reset completion of said chipset; and
a first register electrically connected downstream of said AND gate for storing said reset completion indication signal to be read by said external device.

16. The chipset according to claim 15 wherein said external device is an embedded controller.

17. The chipset according to claim 16 wherein said calculating and recording device comprises an n-bit register electrically connected to said plurality of functional circuits and said embedded controller for storing said reset completion signals, and providing data stored therein for said embedded controller via a bus interface.

18. The chipset according to claim 17 wherein said bus interface is selected from one of a LPC (Low Pin Count) bus and an ISA (Industry Standard Architecture) bus.

19. The chipset according to claim 16 wherein said embedded controller is embedded in a notebook.

20. The chipset according to claim 15 wherein said external device is a central processing unit (CPU).

21. The chipset according to claim 20 wherein, said calculating and recording device comprises an n-bit register electrically connected to said plurality of functional circuits and said CPU for storing said reset completion signals, and providing data stored therein for said CPU.

22. The chipset according to claim 21 wherein said data stored in said first register and said n-bit register is read out to be stored in a functional register, and then provided for said CPU via a bus interface.

23. The chipset according to claim 22 wherein said bus interface is selected from one of a PCI (Peripheral Component Interconnect) bus and an LPC (Low Pin Count) bus.

* * * * *